(12) United States Patent
Leparoux et al.

(10) Patent No.: US 10,094,572 B2
(45) Date of Patent: Oct. 9, 2018

(54) COMBUSTION CHAMBER COMPRISING ADDITIONAL INJECTION DEVICES OPENING UP DIRECTLY INTO CORNER RECIRCULATION ZONES, TURBOMACHINE COMPRISING SUCH A CHAMBER AND FUEL SUPPLY METHOD FOR SUCH A CHAMBER

(71) Applicant: SAFRAN AIRCRAFT ENGINES, Paris (FR)

(72) Inventors: Julien Marc Matthieu Leparoux, Alfortville (FR); Joseph Jean Marie Burguburu, Fontaine le Port (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 189 days.

(21) Appl. No.: 15/216,029

(22) Filed: Jul. 21, 2016

(65) Prior Publication Data

US 2017/0023251 A1     Jan. 26, 2017

(30) Foreign Application Priority Data

Jul. 24, 2015  (FR) ..................... 15 57057

(51) Int. Cl.
*F23R 3/12*    (2006.01)
*F23R 3/34*    (2006.01)
(Continued)

(52) U.S. Cl.
CPC ............... *F23R 3/346* (2013.01); *F02C 9/28* (2013.01); *F23R 3/002* (2013.01); *F23R 3/12* (2013.01);
(Continued)

(58) Field of Classification Search
CPC ...... F23R 3/12; F23R 3/14; F23R 3/50; F23R 3/283; F23R 3/286; F23R 3/346;
(Continued)

(56) References Cited

U.S. PATENT DOCUMENTS 3,961,475 A * 6/1976 Wood ................. F23R 3/12
                                                                239/432
4,035,137 A * 7/1977 Arand ................ F23C 7/00
                                                                431/115
(Continued)

OTHER PUBLICATIONS

French Preliminary Search Report dated Jun. 6, 2016 in French Application 15 57057 filed on Jul. 24, 2015 (with English Translation of Categories of Cited Documents).

*Primary Examiner* — William H Rodriguez
(74) *Attorney, Agent, or Firm* — Oblon, McClelland, Maier & Neustadt, L.L.P.

(57) ABSTRACT

A combustion chamber for an aircraft turbomachine includes an annular chamber end wall and an annular row of injection systems mounted in the annular chamber end wall. Each injection system includes at least one air inlet swirler and a main fuel injection nozzle to output a fuel stream centered on an injection axis and including a central recirculation zone and a corner recirculation zone extending as an annulus around the central recirculation zone chamber. The combustion chamber also includes a plurality of additional fuel injection devices mounted in the chamber end wall to inject fuel directly into the corresponding corner recirculation zones produced by the corresponding injection systems at an operating speed less than or equal to the idling speed.

6 Claims, 5 Drawing Sheets

(51) Int. Cl.
*F23R 3/14* (2006.01)
*F23R 3/28* (2006.01)
*F23R 3/50* (2006.01)
*F02C 9/28* (2006.01)
*F23R 3/00* (2006.01)

(52) U.S. Cl.
CPC ............... *F23R 3/14* (2013.01); *F23R 3/283* (2013.01); *F23R 3/286* (2013.01); *F23R 3/50* (2013.01); *F05D 2220/323* (2013.01); *F05D 2240/35* (2013.01); *F05D 2270/304* (2013.01); *F23R 2900/03282* (2013.01)

(58) Field of Classification Search
CPC .. F23R 2900/03282; F23R 2900/00015; F02C 9/28; F02C 3/34; F05D 2240/35; F23C 9/00; F23C 9/006; F23C 2202/00
See application file for complete search history.

(56) References Cited

U.S. PATENT DOCUMENTS

| | | | | |
|---|---|---|---|---|
| 4,062,182 A * | 12/1977 | Fehler | ............... | F23R 3/02 60/733 |
| 4,343,147 A * | 8/1982 | Shekleton | ............... | F23R 3/38 60/743 |
| 4,373,325 A * | 2/1983 | Shekleton | ............... | F02C 7/2365 60/737 |
| 5,201,650 A | 4/1993 | Johnson | | |
| 5,251,447 A * | 10/1993 | Joshi | ............... | F23R 3/14 239/403 |
| 5,299,930 A * | 4/1994 | Weidman | ............... | F23C 7/00 431/10 |
| 5,411,394 A * | 5/1995 | Beer | ............... | F23C 7/006 110/262 |
| 5,638,682 A * | 6/1997 | Joshi | ............... | F23D 14/02 60/737 |
| 5,865,024 A * | 2/1999 | Kress | ............... | F23D 14/62 60/39.463 |
| 6,164,074 A * | 12/2000 | Madden | ............... | F23R 3/283 60/750 |
| 6,389,815 B1 * | 5/2002 | Hura | ............... | F23R 3/346 60/746 |
| 6,543,235 B1 * | 4/2003 | Crocker | ............... | F23C 9/006 60/742 |
| 9,429,324 B2 * | 8/2016 | Matsuyama | ............... | F23R 3/14 |
| 9,909,755 B2 * | 3/2018 | Robertson | ............... | F23C 9/00 |
| 2001/0010896 A1 * | 8/2001 | Nagayama | ............... | F23C 9/006 431/10 |
| 2002/0160330 A1 * | 10/2002 | Eroglu | ............... | F23R 3/286 431/278 |
| 2002/0162333 A1 * | 11/2002 | Zelina | ............... | F23R 3/14 60/776 |
| 2002/0197580 A1 * | 12/2002 | Carroni | ............... | F23C 7/002 431/353 |
| 2004/0209129 A1 | 10/2004 | Carrea | | |
| 2005/0034444 A1 * | 2/2005 | Sanders | ............... | F23N 1/022 60/39.23 |
| 2005/0106520 A1 * | 5/2005 | Cornwell | ............... | F23D 14/74 431/116 |
| 2005/0268616 A1 * | 12/2005 | Widener | ............... | F23R 3/14 60/776 |
| 2007/0175219 A1 * | 8/2007 | Cornwell | ............... | F23R 3/286 60/737 |
| 2007/0269757 A1 * | 11/2007 | Commaret | ............... | F23R 3/10 431/265 |
| 2010/0011772 A1 * | 1/2010 | Gashi | ............... | F23D 11/107 60/748 |
| 2010/0058732 A1 * | 3/2010 | Kaufmann | ............... | F23C 9/006 60/39.52 |
| 2010/0255435 A1 * | 10/2010 | Singh | ............... | F23R 3/14 431/328 |
| 2010/0287939 A1 * | 11/2010 | Cornwell | ............... | F23C 7/002 60/748 |
| 2011/0185735 A1 | 8/2011 | Snyder | | |
| 2012/0234013 A1 | 9/2012 | Overman et al. | | |
| 2014/0069079 A1 * | 3/2014 | Koizumi | ............... | F23R 3/12 60/39.463 |
| 2015/0323187 A1 * | 11/2015 | Gomez del Campo | ............... | F02C 7/264 60/776 |
| 2016/0281991 A1 * | 9/2016 | Rullaud | ............... | F23R 3/286 |

* cited by examiner

COMBUSTION CHAMBER COMPRISING ADDITIONAL INJECTION DEVICES OPENING UP DIRECTLY INTO CORNER RECIRCULATION ZONES, TURBOMACHINE COMPRISING SUCH A CHAMBER AND FUEL SUPPLY METHOD FOR SUCH A CHAMBER

TECHNICAL DOMAIN

This invention relates to the field of turbomachines for aircraft and more particularly concerns a combustion chamber fitted with injection systems generating a rotational flow of an air and fuel mix that creates a central recirculation zone and a corner recirculation zone.

The invention also relates to a turbomachine comprising such a combustion chamber, and a method of supplying fuel to such a combustion chamber.

STATE OF PRIOR ART

FIG. 1 appended illustrates a turbomachine 10 for an aircraft of a known type, for example a twin spool turbojet comprising in general a fan 12 that will draw in an airflow dividing downstream from the fan into a core engine flow supplying the core of the turbomachine and a fan flow bypassing this core. The turbomachine comprises basically a low pressure compressor 14, a high pressure compressor 16, a combustion chamber 18, a high pressure turbine 20 and a low pressure turbine 22. The turbomachine is surrounded by a nacelle 24 surrounding the flow space 26 of the fan flow. The turbomachine rotors are installed free to rotate about a longitudinal axis 28 of the turbomachine.

FIG. 2 shows the combustion chamber 18 of the turbomachine in FIG. 1. Conventionally, this combustion chamber that is of the annular type, comprises two coaxial annular walls, namely the radially inner wall 32 and the radially outer wall 34, that extend along the upstream to downstream direction 36 of the core engine gas flow in the turbomachine, about the axis of the combustion chamber that is coincident with the longitudinal axis 28 of the turbomachine. These inner annular 32 and outer annular 34 walls are connected to each other at their upstream end by an annular chamber end wall 40 that extends approximately radially about the axis 28. This annular chamber end wall 40 is fitted with injection systems 42 distributed around the axis 28 so that each can inject a premix of air and fuel centred on a corresponding injection axis 44.

The combustion chamber is also usually equipped with one or two ignition plugs 45 installed through the outer annular wall 34.

During operation, a part 46 of an airflow 48 from the compressor 16 supplies the injection systems 42 while another part 50 of this airflow bypasses an upstream part of the combustion chamber flowing in the downstream direction along the coaxial walls 32 and 34 of this chamber and in particular supplies air inlet orifices formed in these walls 32 and 34.

As shown in FIG. 3, each injection system 42 usually comprises a bushing 52, sometimes called a "sliding bushing", in which a fuel injection nozzle 54 is installed, with one or several air inlet swirlers 56, 58, and finally a bowl 60, sometimes called a "mixer bowl" that is essentially in the form of an annular wall with a truncated part tapered outwards in the downstream direction. These elements are centred on the injection axis 44. For reasons of convenience, the fuel injection nozzle 54 is called the "main fuel injection nozzle" in the following description.

The air inlet swirlers 56, 58 are separated from each other by a venturi 59 and can create a rotational flow 61, sometimes called a "swirled flow" that creates two types of recirculation zone, firstly a central recirculation zone 62 and secondly a corner recirculation zone 64 that extends around the central recirculation zone. Reference 66 denotes the limit of the central recirculation zone 62 that is closed at the downstream end thereof.

The current injection technology is based on the use of an aerodynamic or aeromechanical type fuel injection nozzle 54, configured to spray fuel towards the central recirculation zone 62, particularly to stabilise the combustion flame.

However, in the case of an in-flight restart, temperature conditions in the engine make it difficult to create and propagate an energy core so as achieve self-sustained combustion. Air input to the chamber is cold and does not facilitate the combustion initiation process.

Depending on the dimensions of the chamber and the position of the ignition plug, under some operating conditions the energy core close to the plug is not captured by the central circulation zone and the ignition process fails. Another possible cause of failure can be that the fuel concentration close to the plug is insufficient to obtain an energy core.

Moreover, under steady state operating conditions, corner recirculation zones also play a role in stabilising the flame. A flameout phenomenon can also be the result of poor carburation of the air and the fuel in the corner recirculation zone, particularly at idle speeds and at speeds below the idle speed.

PRESENTATION OF THE INVENTION

The purpose of the invention is particularly to provide a simple, economic and efficient solution to these problems, to at least partly avoid the above-mentioned disadvantages.

To achieve this, the invention discloses a combustion chamber for an aircraft turbomachine comprising:

an annular chamber end wall and two coaxial annular walls connected to each other by said annular chamber end wall and centred on a longitudinal axis of the combustion chamber; and an annular row of injection systems mounted in the annular chamber end wall, each injection system comprising at least one air inlet swirler and a main fuel injection nozzle configured to output a main fuel stream centred on an injection axis and comprising a central recirculation zone and a corner recirculation zone extending as an annulus around the central recirculation zone.

According to the invention, the combustion chamber also comprises a plurality of additional fuel injection devices mounted in the chamber end wall and configured to inject fuel directly into the corresponding corner recirculation zones of the injection systems.

The expression "to inject fuel directly into the corner recirculation zones" is intended to specify that fuel from additional fuel injection systems reaches corner recirculation zones without passing through other parts of the fuel layer, particularly without passing through the central recirculation zone and without passing through the flow zone located inside the injection systems. The additional injection devices are provided for this purpose and open up facing corner recirculation zones.

Furthermore, according to the invention, each additional injection device comprises at least one secondary fuel injection nozzle connected to a fuel supply source, and installed to pass through the chamber end wall at a spacing from the corresponding injection system. Said at least one secondary injection nozzle of each additional injection device is fitted with a valve configured to go into an open state when the fuel pressure corresponds to an operating speed less than or equal to the idle speed, and to go into a closed state when the fuel pressure corresponds to an operating speed greater than the idle speed.

The invention is useful particularly to supply secondary fuel injection nozzles during ignition of the combustion chamber. In particular, in the case of an in-flight restart, this provides the ability to reignite the chamber by adding combustion zones in corner recirculation zones which is conducive to propagation of the energy core.

The invention can also stabilise the flame at low speeds.

In particular, it lowers the combustion chamber flameout limit due to the fact the corner recirculation zones are the zones in which combustion stops last during a flameout in the combustion chamber.

The invention also provides a means of improving the homogeneity of the combustion zone within the combustion chamber, which can improve the temperature profile at the outlet from the combustion chamber, and more generally reduce NOx emissions.

Preferably, said at least one secondary fuel injection nozzle of each additional injection device comprises a plurality of secondary fuel injection nozzles. These secondary fuel injection nozzles are preferably arranged to be symmetric about a plane passing through the axis of the combustion chamber and through the injection axis of the corresponding injection system.

Preferably, said plurality of secondary fuel injection nozzles of each additional injection device comprises four secondary fuel injection nozzles.

Preferably, each additional injection device comprises a fuel distribution circuit, connecting each secondary fuel injection nozzle of the additional injection device to said fuel supply source.

The invention also relates to a turbomachine comprising a combustion chamber of the type described above.

The invention also relates to a method of supplying fuel to a combustion chamber of the type described above, comprising the steps of:

supplying fuel to the secondary fuel injection nozzles when the combustion chamber is functioning at a speed less than or equal to the idle speed, such that the additional fuel injection devices then inject additional fuel directly into corner recirculation zones produced by each of the combustion chamber injection systems, and stopping the fuel supply to secondary fuel injection nozzles when the combustion chamber is functioning at a speed greater than the idle speed.

BRIEF DESCRIPTION OF THE DRAWINGS

The invention will be better understood and other details, advantages and characteristics of it will become clear after reading the following description given as a non-limitative example with reference to the appended drawings in which.

In all these figures, identical references may denote identical or similar elements.

DETAILED PRESENTATION OF PREFERRED EMBODIMENTS

Figure 1:
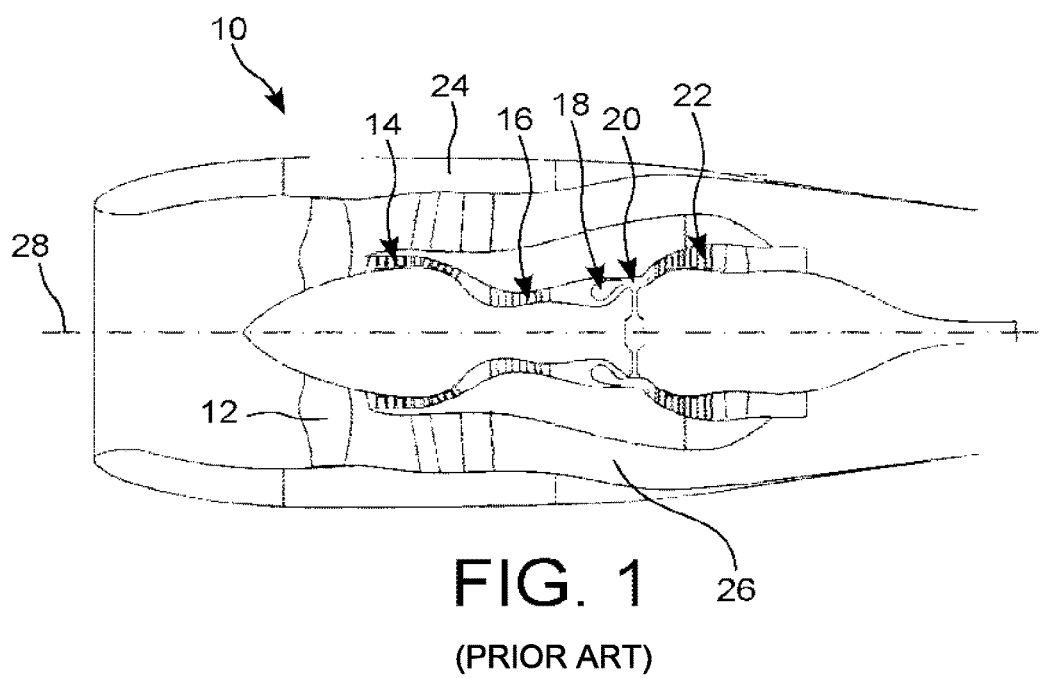
FIG. 1, already described, is a partial diagrammatic axial sectional view of a known type of a turbomachine.
Figure 2:
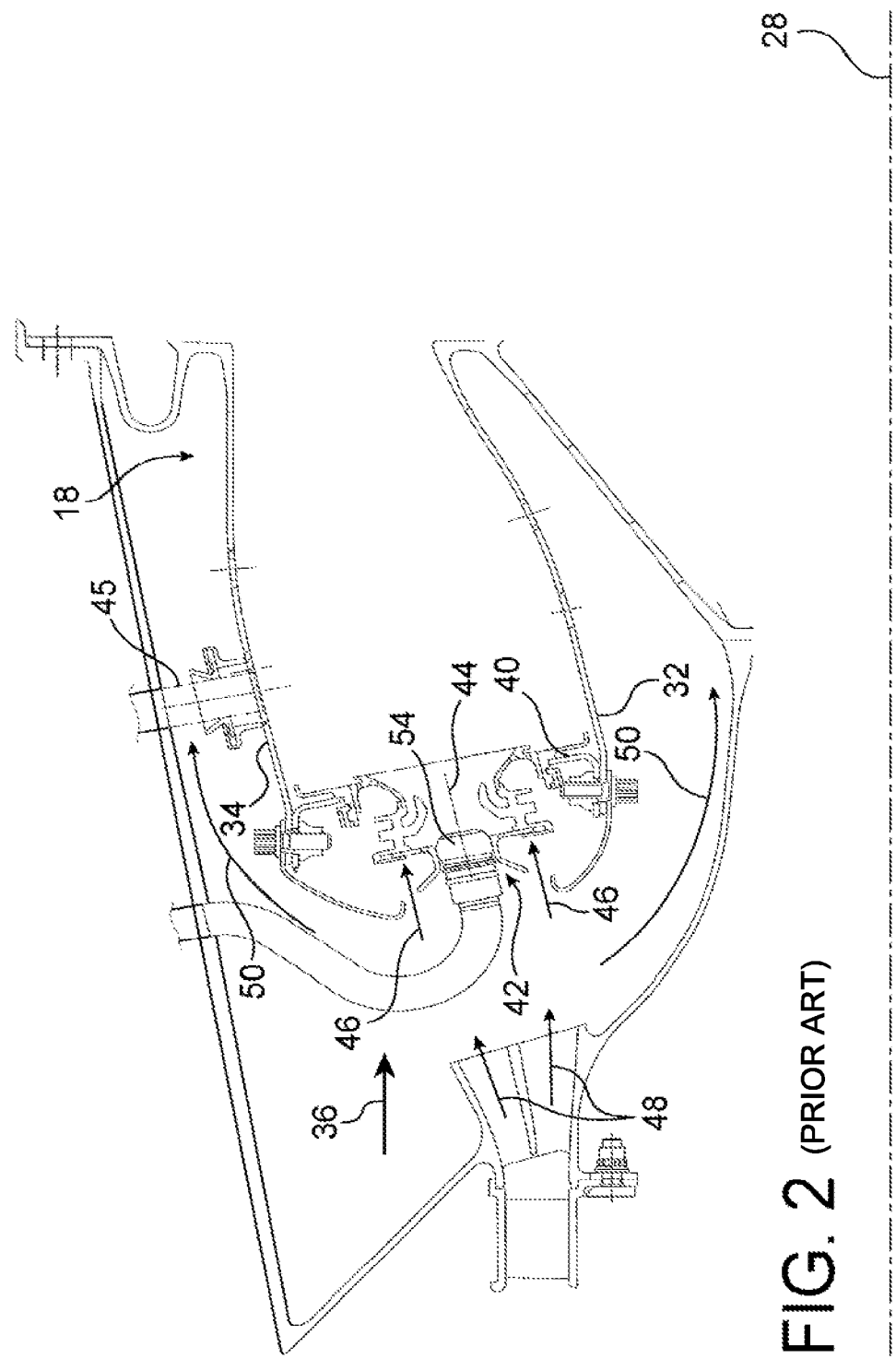
FIG. 2, already described, is a partial diagrammatic axial sectional view of a combustion chamber of the turbomachine in FIG. 1.
Figure 3:
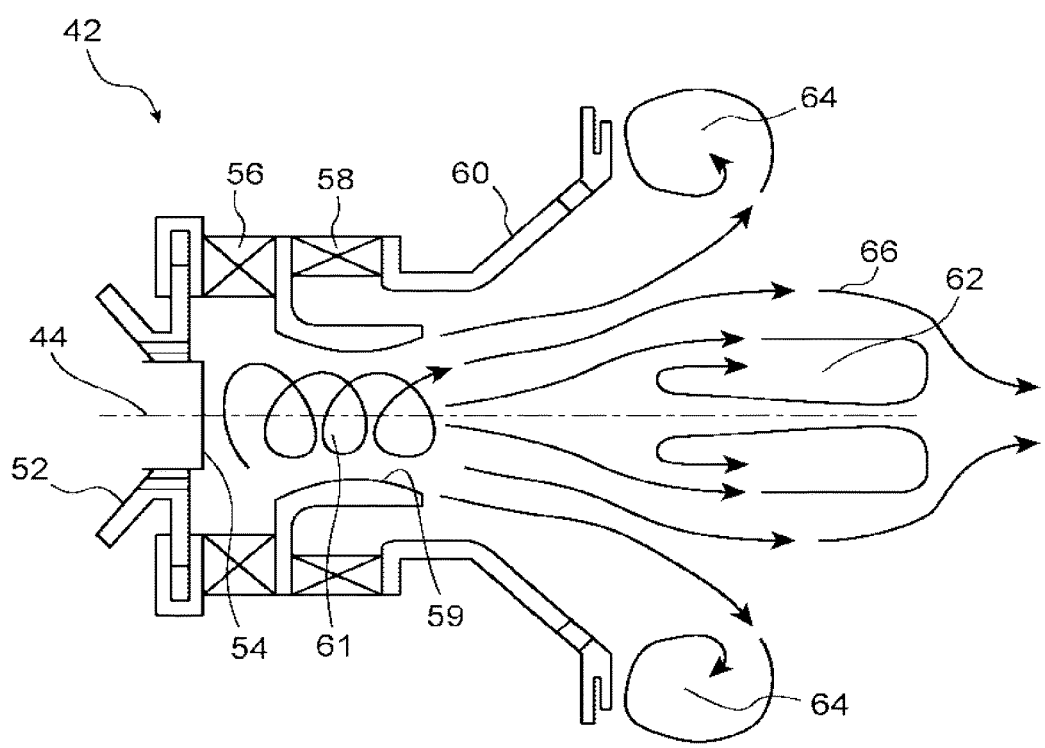
FIG. 3, already described, is a partial diagrammatic axial sectional view of an injection system installed in the combustion chamber in FIG. 2.
Figure 4:
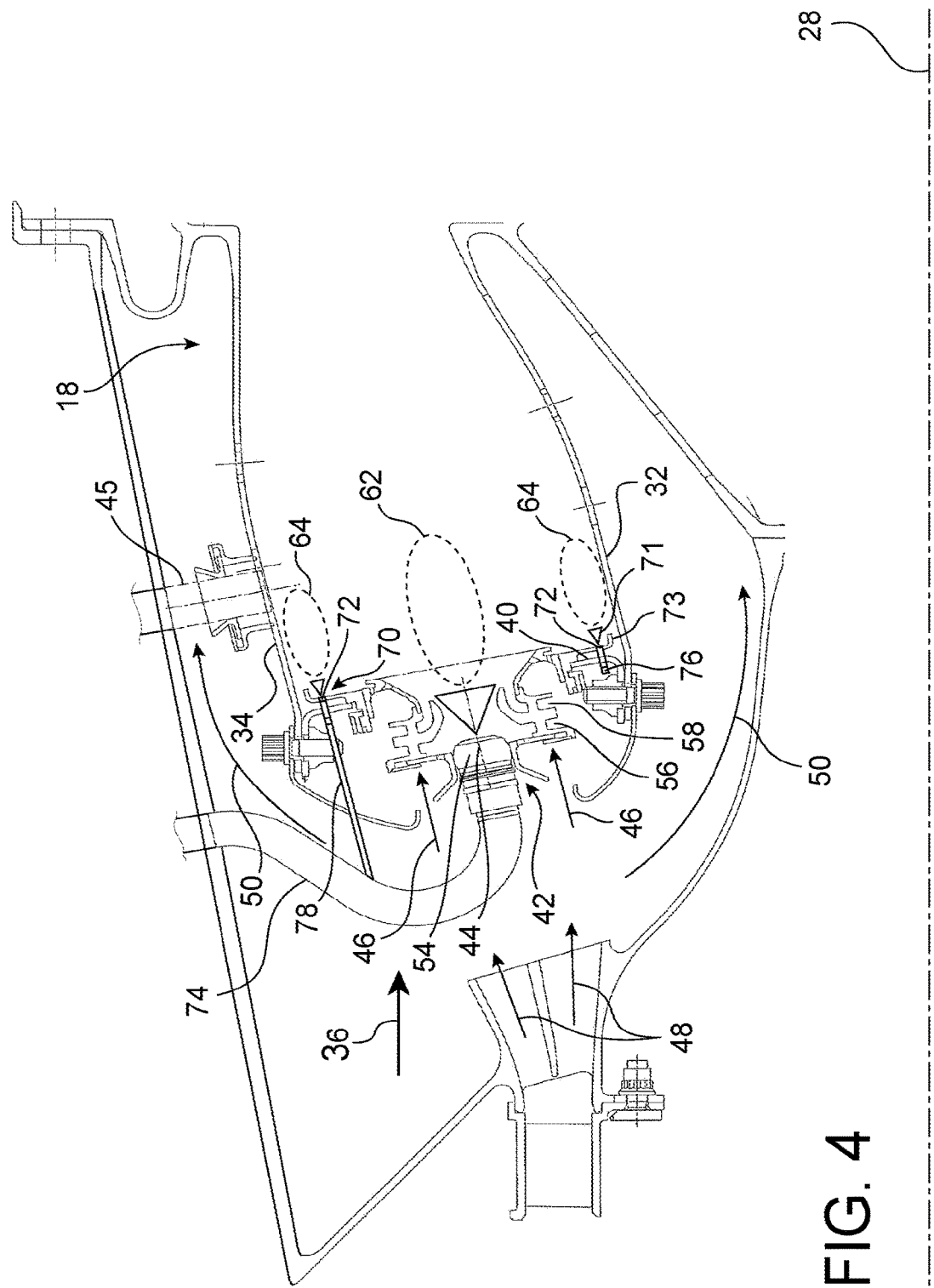
FIG. 4 is a view similar to FIG. 2, illustrating a combustion chamber according to a preferred embodiment of the invention.
Figure 5:
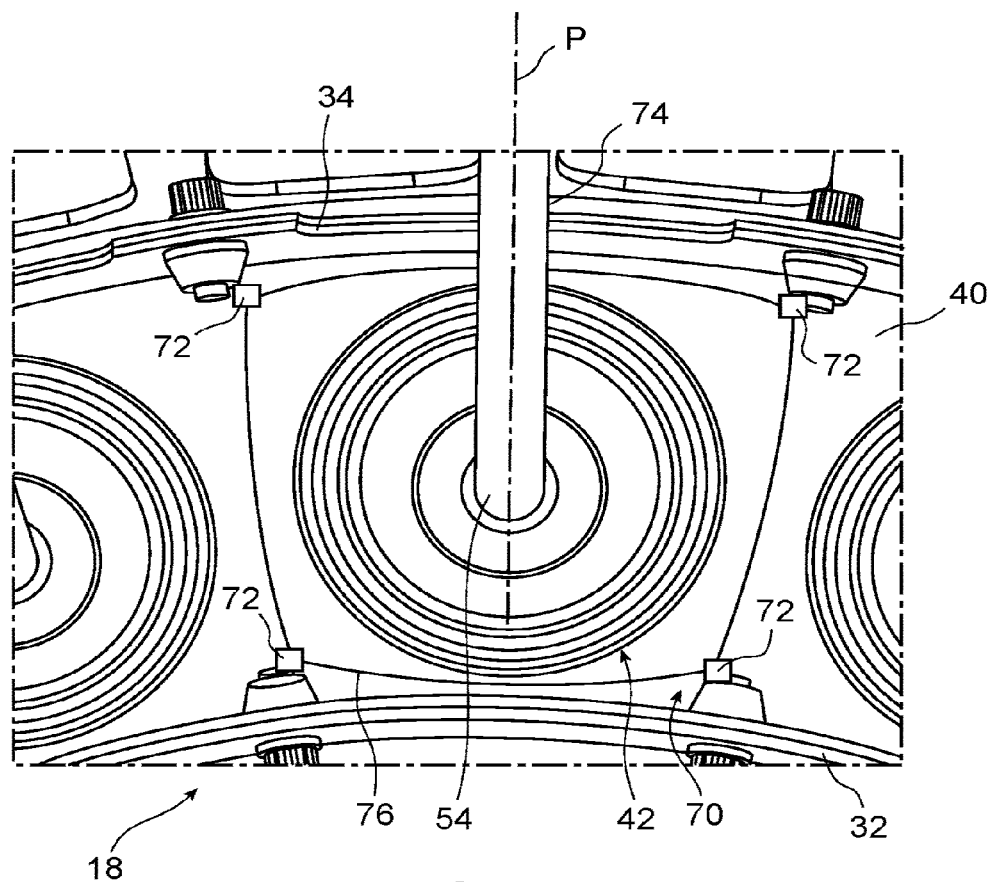
FIG. 5 is a partial diagrammatic view of the combustion chamber in FIG. 4, from the upstream side.

FIGS. 4 and 5 illustrate a combustion chamber 18 of a turbomachine for example similar to the turbomachine in FIG. 1, except that the combustion chamber 18 also comprises a plurality of additional fuel injection devices 70 mounted in the chamber end wall 40 and configured to inject fuel 71 directly into the corresponding corner recirculation zones 64 of the injection systems 42.

More precisely, each additional injection device comprises one or several secondary fuel injection nozzles 72 (shown very diagrammatically) installed through the chamber end wall 40. In the example illustrated, the secondary fuel injection nozzles 72 also pass through a chamber end wall deflector 73.

These secondary fuel injection nozzles 72, for example four of them, are at a spacing from the corresponding injection system 42 as shown more clearly on FIG. 5, such that the secondary fuel injection nozzles 72 open up facing the corner recirculation zone 64 induced by the injection system 42.

Note that only one additional fuel injection device 70 is visible on FIG. 5, since the two devices following it have been omitted to make the figure more easily understandable.

These secondary fuel injection nozzles 72 are arranged to be symmetric about a plane P (FIG. 5) passing through the longitudinal axis 28 of the combustion chamber and through the injection axis 44 of the corresponding injection system 42 (FIG. 4).

The secondary fuel injection nozzles 72 of each additional fuel injection device 70 are connected to a fuel supply source, that may for example be the injector 74 that supplies the corresponding injection system 42.

If each additional fuel injection device 70 comprises several secondary injection nozzles 72, as in the illustrated example, these secondary injection nozzles 72 are preferably connected to a fuel distribution system 76 itself connected to the fuel supply source.

In the illustrated example, the fuel distribution circuit is in the form of a conduit forming a closed loop around the injection system 42. A pipe 78 (only visible very diagrammatically on FIG. 4) connects this conduit to the injector 74.

Therefore the fuel distribution circuits for each of the different additional fuel injection devices 70 are independent of each other.

As a variant, the fuel distribution circuits for each of the different additional fuel injection devices 70 can be connected to each other.

As another variant, the different secondary fuel injection nozzles 72 of each additional fuel injection device 70 can be connected to the fuel source independently of each other.

As another variant, the fuel supply source may be not shared by the main 54 and secondary 52 fuel injection nozzles, and it can be a source dedicated only to the secondary fuel injection nozzles.

Note that only the main fuel injection nozzles 54 are of the aerodynamic or aeromechanical type. The secondary fuel injection nozzles 72 do not have any air inlets and therefore are used only for spraying fuel.

The additional fuel injection devices 70 may be used to implement a method for supplying fuel to the combustion chamber 18 described above.

This method comprises firstly the fuel supply to the main injection nozzles 54, in a conventional manner.

This method also comprises the fuel supply to the secondary injection nozzles 72 when the combustion chamber is operating at a speed less than or equal to the idle speed, and cutting off the fuel supply to these secondary injection nozzles 72 when the combustion chamber operates at a speed greater than the idle speed.

Thus, when the combustion chamber is functioning at a speed less than or equal to the idle speed, the additional fuel injection devices 70 inject additional fuel directly into the corner recirculation zones 64 produced by each of the injection systems 42 of the combustion chamber 18.

The method is implemented mechanically by means of valves fitted on the secondary injection nozzles 72 and configured to go into an open state when the fuel pressure corresponds to an operating speed less than or equal to the idle speed, and to go into a closed state when the fuel pressure corresponds to an operating speed greater than the idle speed.

Therefore the invention is useful particularly to supply secondary fuel injection nozzles 72 with fuel during ignition of the combustion chamber. In particular, in the case of an in-flight restart, this provides the ability to reignite the chamber by adding combustion zones in corner recirculation zones 64, which is conducive to propagation of the energy core.

The invention also stabilises the flame at low speeds and in particular, it lowers the combustion chamber flameout limit due to the fact that the corner recirculation zones 64 are the zones in which combustion stops first during a flameout in the combustion chamber.

The invention also provides a means of improving the homogeneity of the combustion zone within the combustion chamber, which can improve the temperature profile at the outlet from the combustion chamber, and more generally reduce NOx emissions.

The invention claimed is:

1. A combustion chamber for an aircraft turbomachine, comprising:
    an annular chamber end wall and two coaxial annular walls connected to each other by said annular chamber end wall and centred on a longitudinal axis of the combustion chamber; and
    an annular row of injection systems mounted in the annular chamber end wall, each injection system comprising at least one air inlet swirler and a main fuel injection nozzle configured to output a fuel stream centred on an injection axis and comprising a central recirculation zone and a corner recirculation zone extending as an annulus around the central recirculation zone;
    wherein:
    the combustion chamber also comprises a plurality of additional fuel injection devices mounted in the chamber end wall and configured to inject fuel directly into the corresponding corner recirculation zones produced by the injection systems;
    each additional injection device comprises at least one secondary fuel injection nozzle connected to a fuel supply source, and installed to pass through the chamber end wall at a spacing from the corresponding injection system; and
    said at least one secondary injection nozzle of each additional injection device is fitted with a valve configured to go into an open state when a fuel pressure corresponds to an operating speed of the turbomachine less than or equal to the idle speed, and to go into a closed state when a fuel pressure corresponds to an operating speed of the turbomachine greater than the idle speed.

2. The chamber according to claim 1, wherein said at least one secondary fuel injection nozzle of each additional injection device consists of a plurality of secondary fuel injection nozzles arranged symmetrically about a plane passing through the longitudinal axis of the combustion chamber and through the injection axis of the corresponding injection system.

3. The chamber according to claim 2, wherein said plurality of secondary fuel injection nozzles of each additional injection device comprises four secondary fuel injection nozzles.

4. The chamber according to claim 2, wherein each additional injection device comprises a fuel distribution circuit, connecting each secondary fuel injection nozzle of the additional injection device to said fuel supply source.

5. A turbomachine, comprising:
    the combustion chamber according to claim 1.

6. A method of supplying fuel to the combustion chamber according to claim 1, comprising:
    supplying fuel to the secondary fuel injection nozzles when the turbomachine is functioning at a speed less than or equal to the idle speed, such that the additional fuel injection devices then inject additional fuel directly into the corner recirculation zones produced by the corresponding injection systems of the combustion chamber, and
    stopping the fuel supply to the secondary fuel injection nozzles when the turbomachine is functioning at a speed greater than the idle speed.

* * * * *